United States Patent [19]

Kamogawa et al.

[11] Patent Number: 5,245,156
[45] Date of Patent: Sep. 14, 1993

[54] METHOD OF LASER-WELDING METAL SHEETS HAVING DIFFERENT THICKNESSES

[75] Inventors: Hideki Kamogawa, Toyota; Toshikatsu Hirose, Yokohama, both of Japan

[73] Assignees: Toyota Jidosha Kabushiki Kaisha, Toyota; Kanto Jidosha Kogyo Kabushiki Kaisha, Yokosuka, both of Japan

[21] Appl. No.: 929,595

[22] Filed: Aug. 17, 1992

[30] Foreign Application Priority Data

Aug. 23, 1991 [JP] Japan ............................ 3-235738

[51] Int. Cl.$^5$ .................................. B23K 26/00
[52] U.S. Cl. .......................... 219/121.64; 219/121.8
[58] Field of Search ............ 219/121.63, 121.64, 219/121.78, 121.8, 121.81

[56] References Cited

U.S. PATENT DOCUMENTS

| 4,319,122 | 3/1982 | Pope et al. | 219/121.63 |
| 4,650,954 | 3/1987 | Frings et al. | 219/121.64 |
| 4,854,905 | 8/1989 | Shibuya et al. | 219/121.64 X |
| 4,902,872 | 2/1990 | Frings et al. | 219/121.63 |

FOREIGN PATENT DOCUMENTS

| 0279866 | 8/1988 | European Pat. Off. . |
| 63-32555 | 6/1988 | Japan . |
| 63-168286 | 7/1988 | Japan . |

OTHER PUBLICATIONS

Patent Abstract of Japan, vol. 12, No. 269, 27 Jul. 1988.

Primary Examiner—C. L. Albritton
Attorney, Agent, or Firm—Cushman, Darby & Cushman

[57] ABSTRACT

Metal sheets having different thicknesses are abutted and laser-welded. During laser welding, the laser beam weaves from side to side with respect to a weld line. As a result, the width of the weld bead is increased and the gradient of the weld bead surface is decreased whereby no sharp edge remains at the weld line. The resulting one-piece sheet can be used as a press material without any pre-pressing processing, such as grinding.

9 Claims, 7 Drawing Sheets

METHOD OF LASER-WELDING METAL SHEETS HAVING DIFFERENT THICKNESSES

BACKGROUND OF THE INVENTION

1. Field of the Invention

The present invention relates to a method of laser-welding metal sheets having different thicknesses together without leaving a sharp edge at the welded portion.

2. Description of the Prior Art

To decrease weight and increase the rigidity of vehicles and to improve yield ratios of materials, one-piece materials are formed by laser-welding metal sheets having different thicknesses along abutting edges. The resulting assembly may be used as a press material for outer or inner body panels of vehicles.

Figure 12:
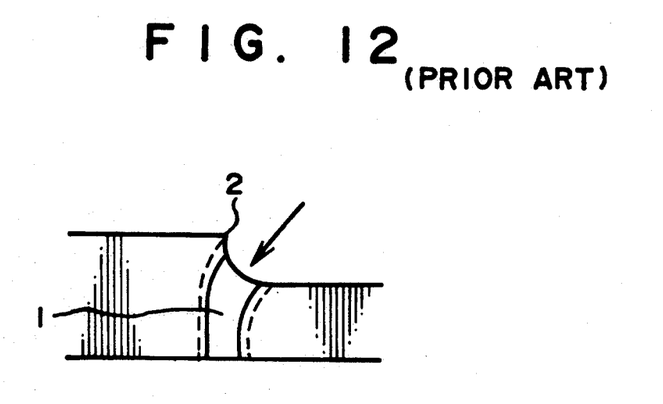
FIG. 12 is a cross-sectional view of laser weld bead between metal sheets having different thicknesses in accordance with a conventional method.

Japanese Patent Publication SHO 63-168286 discloses laser-welding two metal sheets having different thicknesses together by linearly moving the laser beam along the weld line. However, as illustrated in FIG. 12, with the conventional welding method, a sharp edge 2 remains at the corner of the thicker plate at the welded portion 1. To protect the press roll from galling while stamping such a laser-welded press material, the sharp edge must be removed by, for example, grinding after the sheets are welded. However, such grinding requires an additional manufacturing step and increases the cost to an unacceptably high level. Furthermore, in some cases, the strength of the panel is decreased as a result of over-grinding.

SUMMARY OF THE INVENTION

An object of the invention is to provide a method of laser-welding two metal sheets having different thicknesses together without leaving a sharp edge at the welded portion.

This object is achieved by providing a method of laser-welding metal sheets having different thicknesses together, in accordance with the present invention, which includes the steps of: clamping the metal sheets having different thicknesses so that the metal sheets abut each other; and laser-welding the metal sheets together while weaving the laser beam from side to side with respect to the weld line.

As a result of weaving the laser beam, the weld bead is wider in a direction perpendicular to the weld line than in the conventional method and the surface of the weld bead gradually changes from the surface of one steel sheet to the surface of the other steel sheet. As a result, no sharp edge remains at the welded portion after laser welding.

BRIEF DESCRIPTION OF THE DRAWINGS

The above and other objects, features, and advantages of the present invention will become more apparent and will be more readily appreciated from the following detailed description of the preferred embodiment of the invention taken in conjunction with the accompanying drawings, in which.

DETAILED DESCRIPTION OF THE PREFERRED EMBODIMENT

Figure 1:
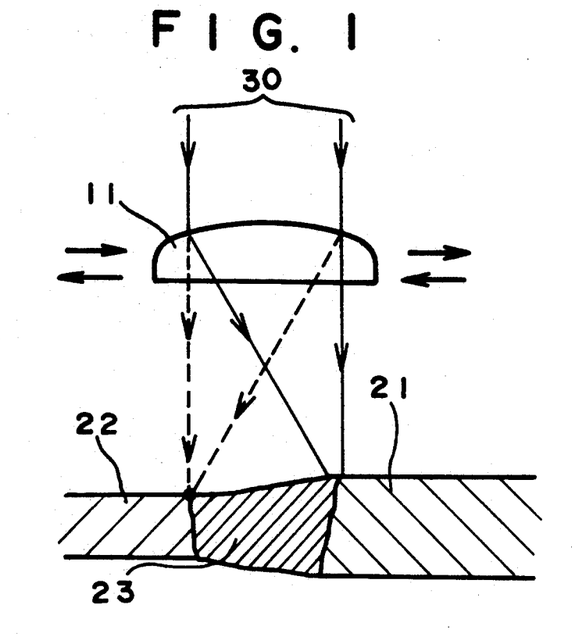
FIG. 1 is an enlarged schematic cross-sectional view of a weaved laser beam and metal sheets welded by the laser beam in accordance with the present invention.
Figure 2:
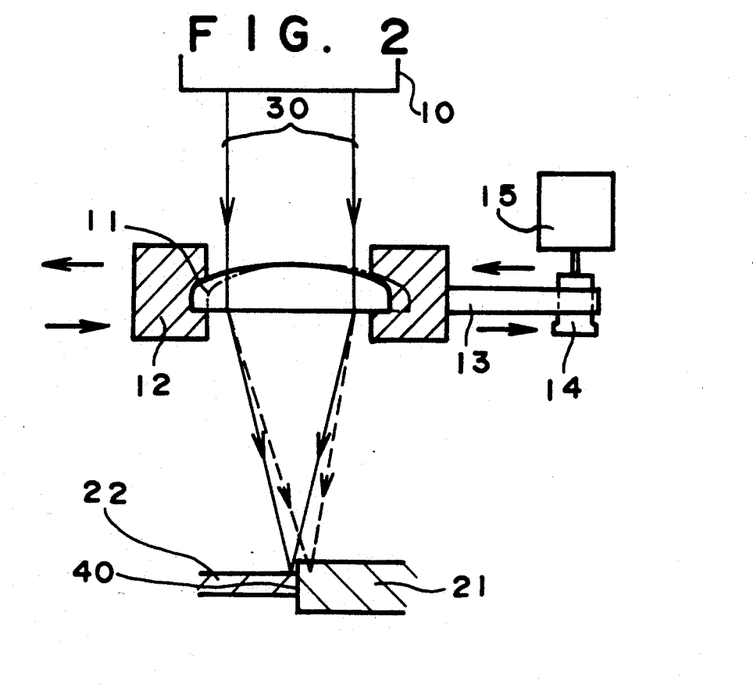
FIG. 2 is a cross-sectional view of a portion of a laser welding apparatus for executing a laser welding method in accordance with the present invention.

As illustrated in FIGS. 1 and 2, a laser welding apparatus for executing a laser welding method in accordance with the invention includes a laser torch 10 for emitting a laser beam 30, a condenser lens 11 for focusing the laser beam 30, a lens mount 12 for supporting the condenser lens 11, and a drive mechanism for reciprocally driving the lens mount 12 and the condenser lens 11. The laser torch 10 is moved linearly along the weld line by a robot. The assembly of the condenser lens 11 and the lens mount 12 is reciprocal in a direction perpendicular to the weld line. The drive mechanism is connected to the lens mount 12 and reciprocally drives the lens mount 12 and the condenser lens 11 perpendicularly to the weld line. As a result, the laser beam 30 weaves from side to side with respect to the weld line 40.

The drive mechanism includes, for example, an electric motor 15 of the variable rotational speed-type, an eccentric cam 14 having a cam surface eccentric with respect to a rotational axis of the cam and connected to an output shaft of the motor 15 to thereby generate a reciprocal motion, and a connecting member 13 for transmitting the reciprocal motion of the cam surface of the eccentric cam 14 to the condenser lens mount 12. The eccentric cam 14 is rotatably fitted in a circular hole formed in one end portion of the connecting member 13 and an opposite end portion of the connecting member 13 is pivotably connected to the lens mount 12.

Figure 7:
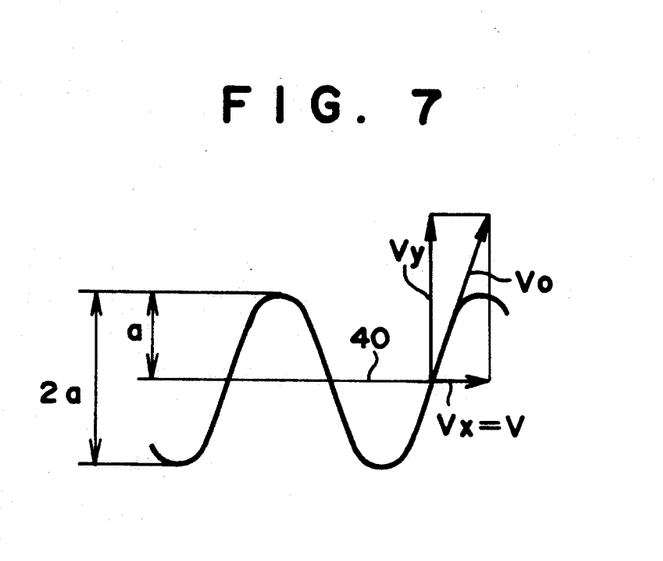
FIG. 7 is a schematic vies of a sinusoidal wave which the weaving laser beam traces.

With the drive mechanism shown in FIG. 2, the weaving laser beam traces a sinusoidal wave as shown in FIG. 7. The amplitude of weaving of the laser beam can be changed by changing the difference between the largest radius and the smallest radius of the cam surface of the eccentric cam 14 and the frequency of weaving of the laser beam can be changed by changing the rotational speed of the motor 15.

Using the laser welding apparatus, the method of laser-welding metal sheets 21 and 22 having different thicknesses to form a press material for one piece stamping in accordance with one embodiment of the invention is carried out. The laser-welded materials are pressed after laser welding and used as outer and/or inner body panels for automobiles. The metal sheets for panels for automobiles have a thickness in the range of 0.7 to 2.3 mm. It is sufficient for automobile panels to provide a method capable of laser-welding a first metal sheet to a second metal sheet having a thickness greater than half the thickness of the first metal sheet and less than twice the thickness of the first metal sheet.

The laser welding method is executed as follows: First, metal sheets 21 and 22 (for example, steel sheets or galvanized steel sheets) press-cut to necessary dimensions and having different thicknesses are prepared. Then, the metal sheets 21 and 22 are clamped with sheet clamping devices (not shown) so that the metal sheets 21 and 22 abut each other. Preferably, the thickness centers of the metal sheets 21 and 22 are aligned, so that the step between the surfaces of the sheets 21 and 22 is minimized.

Then, the metal sheets 21 and 22 are laser-welded together, weaving the laser beam 30 from side to side with respect to the weld line 40. More particularly, during laser welding, the laser torch 10 is moved linearly along the weld line 40 and the condenser lens 11 is reciprocated in a direction perpendicular to the weld line 40. Weaving the laser beam 30 widens the weld bead so that the surface of one steel sheet 21 gradually and smoothly changes to the surface of the other steel sheet 22 via the surface of the weld bead. During laser welding, the thicker sheet should be completely melted over the entire thickness thereof so that no edge of the thicker plate remains at the welded portion.

Figure 3:
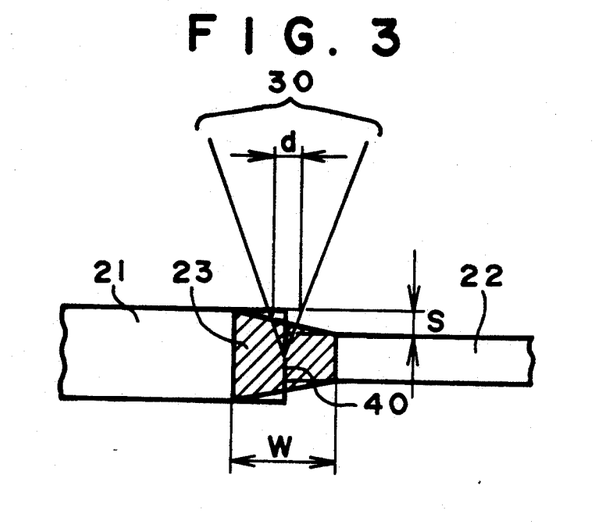
FIG. 3 is an enlarged schematic cross-sectional view of the focused laser beam and metal sheets of FIG. 1.
Figure 4:
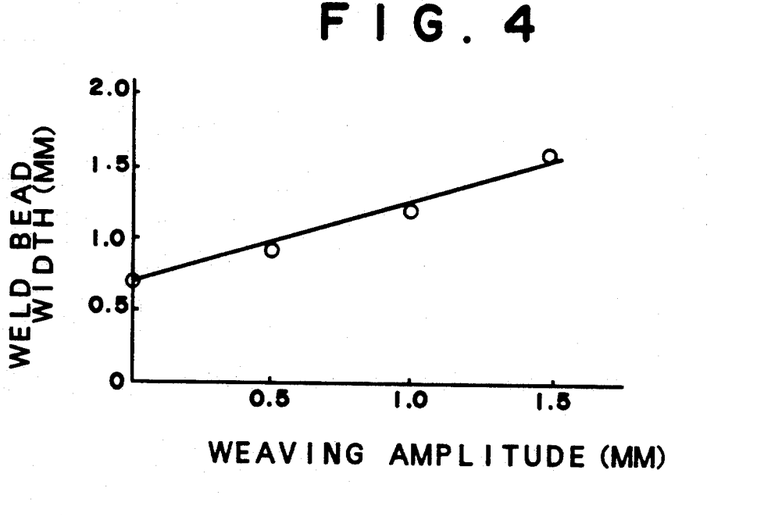
FIG. 4 is a graphical representation of a weld bead width versus laser beam weaving amplitude characteristic.

To obtain a weld bead having smoothly continuous bead surfaces and no sharp edge at the weld line, it is preferable to satisfy the following laser welding conditions:

First, a width W (see FIG. 3) of the weld bead 23 is selected to be equal to or greater than 1.0 mm. If the weld beam is not weaved, the width of the weld bead will be 0.5 to 0.7 mm. Due to the weaving of the laser beam 30, the width of the weld bead 23 is widened as shown in FIG. 4. If the width of the weld bead is less than 1.0 mm, the gradient (S/W, where S is the offset between the surfaces of the metal sheets) of the surface of the weld bead is too steep to generate an edged corner at the ends of the surfaces of the thicker sheet.

Figure 5:
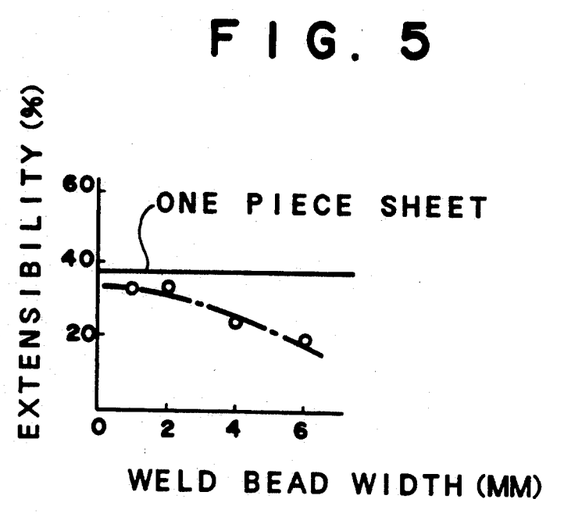
FIG. 5 is a graphical representation of an extensibility versus weld bead width characteristic.

Second, the width W of the weld bead should be less than 2.0 mm. Though it is preferable to increase the width of the laser bead 23 from the viewpoint of making the gradient of the surface of the weld bead small, there is an upper limit to the width from the viewpoint of extensibility. Since the welded sheet is pressed after laser welding, the weld sheet should have an extensibility substantially equal to that of a non-welded one piece sheet. In FIG. 5, the one-dotted chain line illustrates the relationship between an extensibility (%) and a weld bead width (mm) of a welded sheet and the full line illustrates the extensibility (%) of a non-welded sheet. As is seen from FIG. 5, the welded sheet has an extensibility substantially equal to that of a non-welded sheet if the width of the weld bead is equal to or less than 2.0 mm. Thus, the width of the weld bead should be equal to or less than 2.0 mm.

Figure 6:
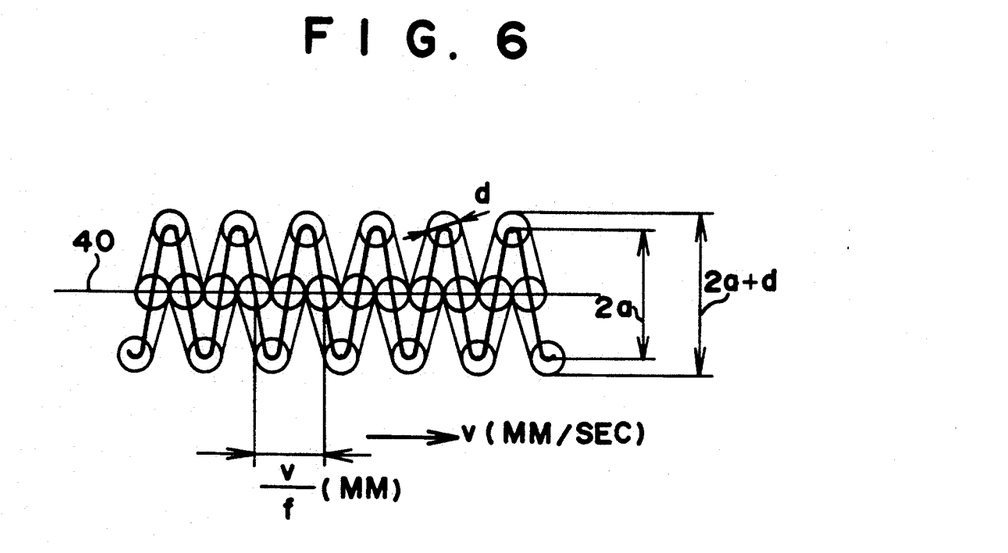
FIG. 6 is a schematic plan view of a weaving line of the laser beam with respect to a weld line.

Third, the amplitude of weaving of the laser beam 30 is selected to be equal to or greater than 0.25 mm. The width W of the weld bead 23 can be approximately calculated by the following equation, as shown in FIG. 6:

$$W = 2 * a + d$$

where, a is an amplitude of weaving of the laser beam, and d is a diameter of a heating spot of laser beam.

Since the minimum width is 1.0 mm and the diameter d is about 0.5 mm, a minimum amplitude of weaving of the laser beam is 0.25 mm.

Fourth, since the maximum width is 2.0 mm and the diameter d is about 0.5 mm, a maximum amplitude of weaving of the laser beam is 0.75 mm.

Fifth, the frequency f of weaving of the laser beam 30 should have the following relationship with respect to the speed v of the moved laser torch as shown in FIG. 6, so that the weld line 40 is continuously melted by the heating spot of the laser beam:

$$f \geq v/(2 * d)$$

Sixth, there is an upper limit to the frequency of weaving of the laser beam to form a weld bead at the back surface of the thicker sheet. More particularly, as shown in FIG. 7, there is the relationship between an actual weaving speed v0 of the laser beam 30 and the torch speed v:

$$\begin{aligned} v0 &= vx^2 + vy^2 \\ &= v^2 + a^2 w^2 \cos^2 wt \\ &= v^2 + 4\pi f^2 a^2 \cos^2 wt \end{aligned}$$

Figure 8:
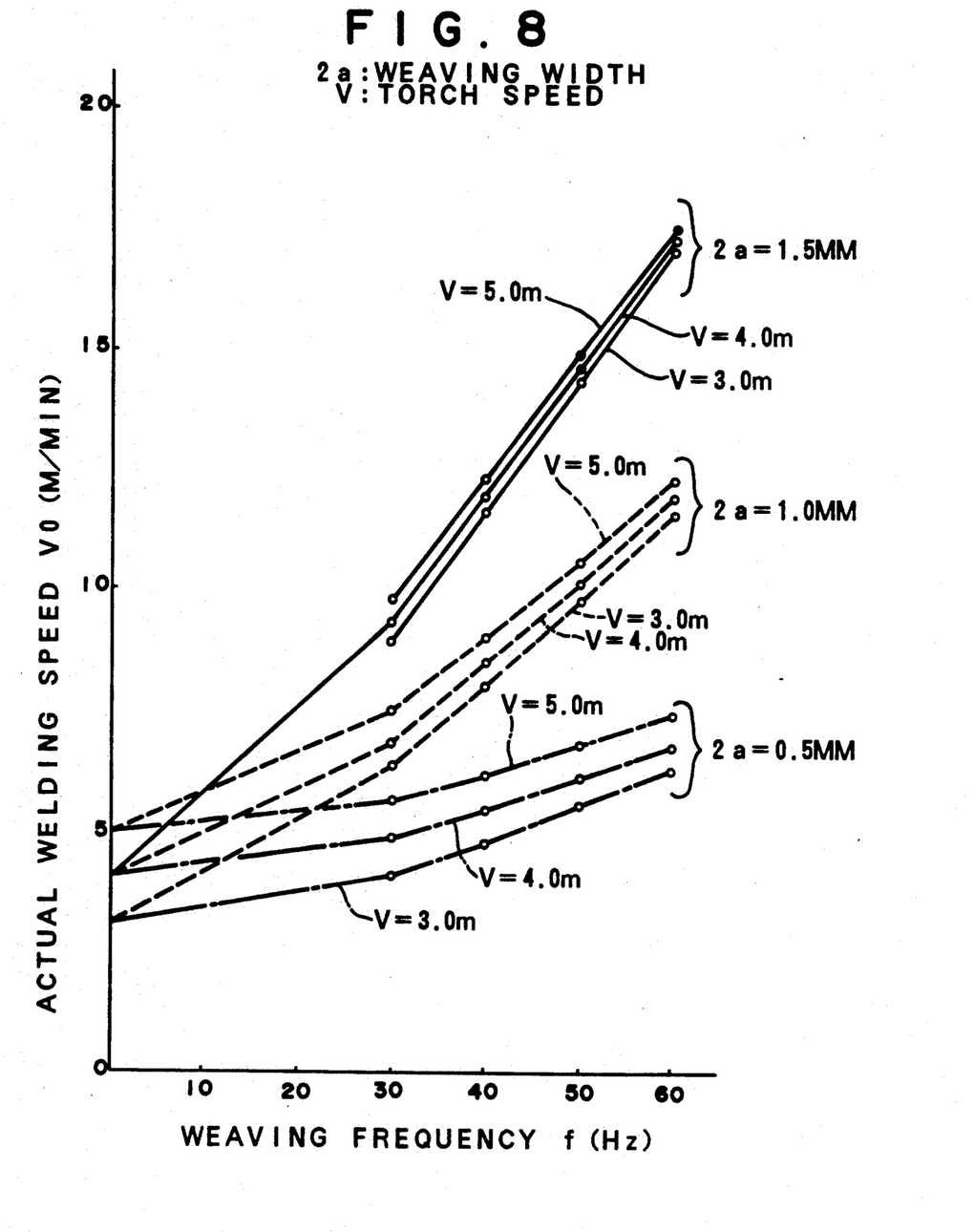
FIG. 8 is a graphical representation of actual weld speed versus weaving frequency characteristic.
Figure 9:
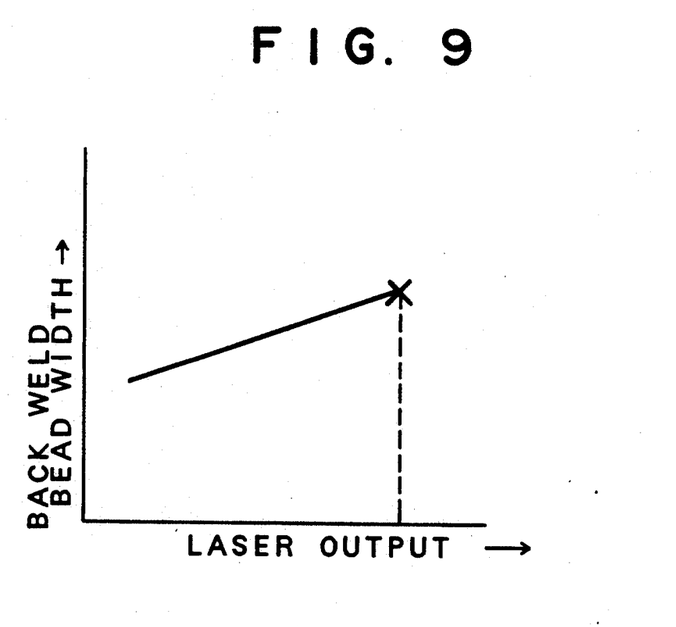
FIG. 9 is a graphical representation of back weld bead width versus laser output characteristic.
Figure 10:
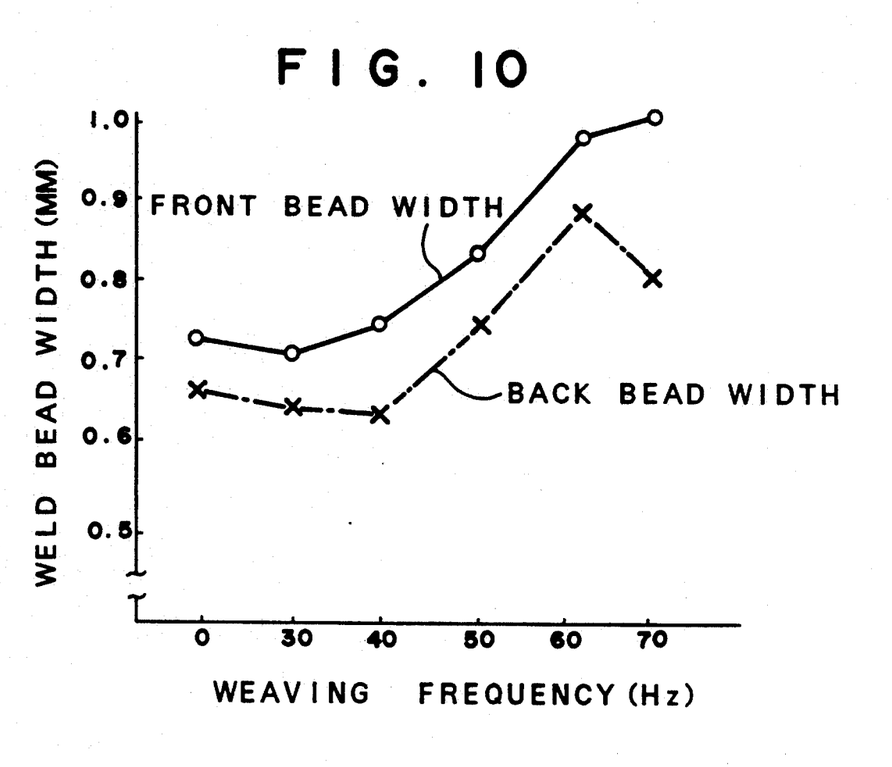
FIG. 10 is a graphical representation of weld bead width versus weaving frequency characteristic.

As will be understood from this equation, the higher the frequency of weaving of the laser beam is, the higher the actual speed of the laser beam is. In this instance, the torch speed v is constant. FIG. 8 illustrates the results of various tests where weaving widths (twice the amplitude of weaving) are changed. From FIG. 8, it is seen that the weaving frequency has a great effect on the actual speed of the laser beam. When the laser beam speed is great, the supplied energy per unit weld length at the welding line 40 is small and is insufficient to form a weld bead at the back surface of the thicker sheet. When the laser output is increased, the supplied energy is great and the width of the weld bead measured at the back surface of the sheet is great, as shown in FIG. 9. Therefore, when the laser beam speed is increased, the laser output should be increased. However, there is a limit to the laser output. As a result, when the frequency of weaving of the laser beam is increased to a certain value (for example, 70 Hz in FIG. 10) and the laser beam speed is thus increased, formation of a weld bead at the back surface of the thicker sheet suddenly deteriorates as shown in FIG. 10. Accordingly, the weaving frequency of the laser beam should be selected to be less than that certain value.

Figure 11:
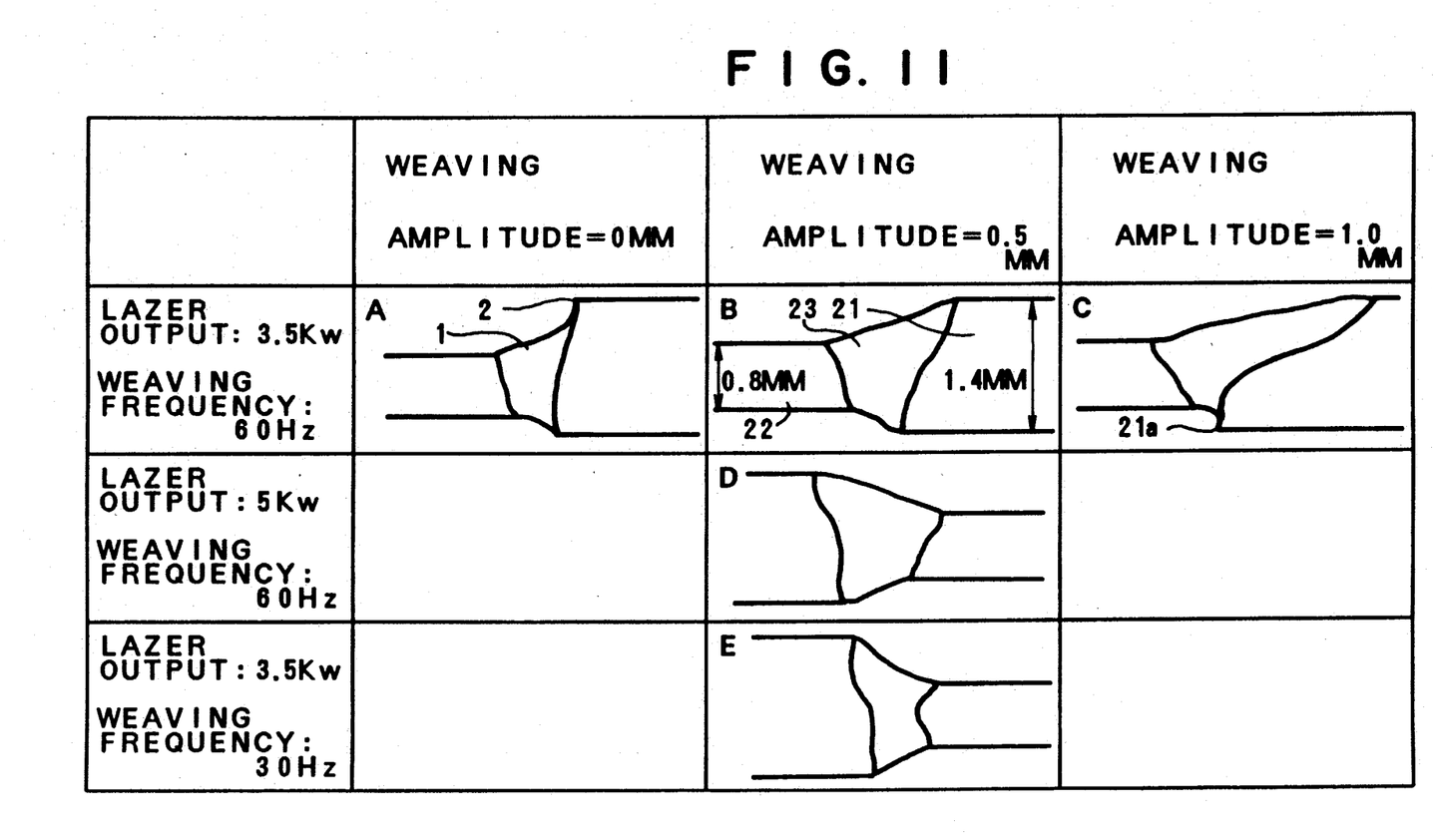
FIG. 11 is a table including Boxes A, B, C, D, and E which show cross sections of various weld beads.

FIG. 11 illustrates typical test results.

Boxes A, B, and C of FIG. 11 illustrate the results of tests in which the weaving amplitude was changed variously. In the tests, the thickness of one steel sheet was 1.4 mm and the thickness of the other steel sheet was 0.8 mm. The laser output was 3.5 KW and the frequency of weaving of the laser beam was 60 Hz.

Box (A) of FIG. 11 corresponds to the result of the test where the laser beam was not weaved (which corresponds to the conventional case). In that case, an edge remains at the surface of the thicker plate. Further, the width of the weld bead is about 1.0 mm and a steep gradient is formed at the weld bead surface.

Box (B) of FIG. 11 which corresponds to one case of the present invention, shows the result of the test where the amplitude of weaving of the laser beam was selected to be 0.5 mm. No edge remains at the weld bead surfaces.

Box (C) of FIG. 11 which is not included in the present invention, shows the result of the test where the amplitude of weaving of the laser beam was selected to be 1.0 mm. In that test, the actual weaving speed of the laser beam was too large to melt the back surface of the thicker sheet and a sharp edge 21a remained at the end of the back surface of the thicker sheet.

Boxes B, D, and E of FIG. 11 illustrate the results of tests where the frequency of weaving of the laser beam and the laser output were changed variously though the weaving amplitude was fixed to 0.5 mm. Each of Boxes B, D, and E is in accordance with the present invention. In the case of Box B of FIG. 11, the weaving frequency was selected to be 60 Hz and the laser output was selected to be 3.5 KW. In the case of Box D of FIG. 11, the weaving frequency was selected to be 60 Hz and the laser output was selected to be 5 KW. In the case of Box E of FIG. 11, the weaving frequency was selected to be 30 Hz and the laser output was selected to be 3.5 KW. In all of the Box B, D, and E cases, the edge was removed from the welded portion.

The sheets constructed through laser welding of different thickness sheets are pressed after laser welding to form outer or inner body panels of vehicles. Since the sheets have no sharp edge at the welded portions, the press roll does not cause a galling during press. As a result, grinding before pressing, which was thought to be indispensable in the past, can be omitted. The omission of grinding decreases the manufacturing cost of the assembly.

In accordance with the present invention, since the laser beam weaves from side to side with respect to the weld line, the width of the laser bead is increased and weld bead surface can smoothly connect the surface of the thicker sheet to the surface of the thinner sheet. As a result, the thus welded sheets do not damage the press roll, even if the sheets are not grinded before being pressed.

Although only one embodiment of the invention has been described in detail above, it will be appreciated by those skilled in the art that various modifications and alterations can be made to the particular embodiment shown without materially departing from the novel teachings and advantages of the present invention. Accordingly, it is to be understood that all such modifications and alterations are included within the spirit and scope of the present invention as defined by the following claims.

What is claimed is:

1. A method of laser-welding metal sheets having different thicknesses together for one piece stamping, comprising the steps of:
   clamping metal sheets having different thicknesses so that the metal sheets abut each other at end surfaces thereof to define a weld line, each of said metal sheets having a thickness in the range of about 0.7 mm to about 2.3 mm;
   generating a laser beam with a laser welding apparatus;
   directing said laser beam toward and along at least a portion of said weld line; and
   during said step of directing, weaving said laser beam from side to side with respect to the weld line, thereby to form a weld bead which laser-welds the metal sheets together.

2. A method according to claim 1, wherein, during said step of clamping the metal sheets, thickness centers of the metal sheets are aligned.

3. A method according to claim 1, wherein, during said step of weaving the laser beam, a condenser lens of the laser welding apparatus is reciprocated in a direction perpendicular to the weld line while a welding torch of the laser welding apparatus is linearly moved.

4. A method according to claim 1, wherein a width of the weld bead is equal to or greater than 1.0 mm.

5. A method according to claim 1, wherein a width of the weld bead is equal to or less than 2.0 mm.

6. A method according to claim 1, wherein an amplitude of weaving of the laser beam is equal to or greater than 0.25 mm.

7. A method according to claim 1, wherein an amplitude of weaving of the laser beam is equal to or less than 0.75 mm.

8. A method according to claim 1, wherein a frequency of weaving of the laser beam satisfies the following relationship:

$$f \cong v/(2 * d)$$

where,
   f is a frequency of the laser beam,
   v is a moving speed of a welding torch measured in milimeters, and
   d is a diameter of a laser beam spot at a surface of a thicker of the two metal sheets measured in millimeters.

9. A method according to claim 1, wherein a frequency of weaving of the laser beam is less than a predetermined maximum frequency so that a weld bead can be formed at a back surface of a thicker of the two metal sheets.

* * * * *